US012806988B2

(12) United States Patent
Cai

(10) Patent No.: US 12,806,988 B2
(45) Date of Patent: Nov. 24, 2026

(54) HUB MOTOR DRIVING SYSTEM AND VEHICLE

(71) Applicant: Schaeffler Technologies AG & Co. KG, Herzogenaurach (DE)

(72) Inventor: Xiangyang Cai, Kunshan (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 275 days.

(21) Appl. No.: 18/689,196

(22) PCT Filed: Sep. 7, 2021

(86) PCT No.: PCT/CN2021/116887

§ 371 (c)(1),
(2) Date: Mar. 5, 2024

(87) PCT Pub. No.: WO2023/035105

PCT Pub. Date: Mar. 16, 2023

(65) Prior Publication Data

US 2024/0367502 A1 Nov. 7, 2024

(51) Int. Cl.
*B60K 7/00* (2006.01)

(52) U.S. Cl.
CPC .... *B60K 7/0007* (2013.01); *B60K 2007/0092* (2013.01); *B60Y 2410/10* (2013.01); *B60Y 2410/102* (2013.01)

(58) Field of Classification Search
CPC .............................. B60K 7/0007; B60K 7/083
See application file for complete search history.

(56) References Cited

U.S. PATENT DOCUMENTS

| | | | | |
|---|---|---|---|---|
| 8,863,873 B2 * | 10/2014 | Lee | .......................... | B60L 7/24 180/65.51 |
| 9,073,424 B2 * | 7/2015 | Vogler | ...................... | B60B 3/16 |
| 9,073,425 B2 * | 7/2015 | Vogler | .................... | F16D 55/00 |

FOREIGN PATENT DOCUMENTS

| | | |
|---|---|---|
| CN | 102648362 A | 8/2012 |
| CN | 103026103 A | 4/2013 |
| CN | 103129372 A | 6/2013 |
| CN | 103328247 A | 9/2013 |
| CN | 106864251 A | 6/2017 |
| CN | 107128162 A | 9/2017 |
| CN | 109866607 A | 6/2019 |
| CN | 110203058 A | 9/2019 |
| CN | 111169274 A | 5/2020 |
| CN | 210733818 U | 6/2020 |
| JP | 2007253687 A * | 10/2007 |
| JP | 2011189920 A | 9/2011 |

* cited by examiner

*Primary Examiner* — Steve Clemmons
(74) *Attorney, Agent, or Firm* — Price Heneveld LLP

(57) ABSTRACT

A hub motor driving system for a vehicle includes: a wheel axle fixedly connected to a frame of the vehicle; a driving motor provided with a motor stator and a motor rotor which is located on the radial inner side of the motor stator and can rotate relative to the motor stator, the driving motor and the wheel axle being coaxially disposed; an output flange which radially supports the motor rotor and rotates along with the motor rotor, wherein the output flange is connected to a wheel rim of a wheel on the axial direction side in an anti-torque manner; and bearing devices radially supported between the output flange and the wheel axle, wherein the bearing devices bear both a load of the driving motor and a load of the frame.

20 Claims, 2 Drawing Sheets

HUB MOTOR DRIVING SYSTEM AND VEHICLE

CROSS-REFERENCE TO RELATED APPLICATION

This application is a U.S. national stage application under 35 U.S.C. § 371 that claims the benefit of priority under 35 U.S.C. § 365 of International Patent Application No. PCT/CN2021/116887, filed on Sep. 7, 2021, designating the United States of America, the contents of which are relied upon and incorporated herein by reference in their entirety.

FIELD OF THE DISCLOSURE

The present disclosure relates to a hub motor driving system for a new energy automobile. A driving motor, a wheel bearing, and a drum brake are integrated into a wheel space, such that the wheel space is effectively utilized, and a wheel is directly driven by the driving motor without the need for clutches and transmission shafts. In addition, the present disclosure further relates to a vehicle provided with a hub motor driving system.

BACKGROUND OF THE DISCLOSURE

Hub motor technology is also called in-wheel motor technology, with the biggest feature thereof being that power, transmission, and braking devices are integrated into a hub, thus greatly simplifying mechanical parts of electric vehicles. A driving motor may be directly mounted in a hub of a wheel. When driving the wheel, the driving motor directly outputs driving torque to the wheel, and when the wheel is braked, this is achieved by means of a brake mounted outside a hub driver.

CN201710507523, CN201710077995, and CN201910256999 disclose a hub driving device provided with a differential planetary gear reducer. A driving motor is supported on a wheel axle fixedly connected to a frame of a vehicle by means of a motor bearing. In addition, a wheel bearing is provided on the wheel axle, and is used for bearing a load that a wheel should bear.

CN103328247A, CN103026103A, and CN102648362A disclose a hub driving device provided with a cycloidal gear reducer. This hub driving device has a structure similar to that of the above-mentioned hub driving device provided with a differential planetary gear reducer and is also provided with a wheel bearing and a motor bearing to bear loads of a motor and a wheel, respectively.

In order to achieve higher driving torque performance using current direct driving devices, the diameter of a motor is very large. Therefore, the motor is only suitable for large-size tires, and requirements on motor bearings are also very high. In existing wheel driving devices provided with gear reducers, wheel bearings, reducers, brakes, and driving motors are simply integrated together. An overall mounting width is large, and thus the scope of application is limited. There is an urgent need in the market to reduce axial sizes of hub driving systems.

SUMMARY OF THE DISCLOSURE

According to one aspect of the present disclosure, a hub motor driving system for a vehicle is relatively small in the axial dimension and is relatively cost effective with regard to component costs. The hub motor driving system comprises: a wheel axle fixedly connected to a frame of the vehicle; a driving motor provided with a motor stator and a motor rotor which is located on a radial inner side of the motor stator and can rotate relative to the motor stator, the driving motor and the wheel axle being coaxially disposed; an output flange which radially supports the motor rotor and rotates along with the motor rotor, wherein the output flange is connected to a wheel rim of a wheel on the axial direction side in an anti-torque manner; and bearing devices radially supported between the output flange and the wheel axle, wherein the bearing devices bear both a load of the driving motor and a load of the wheel axle.

As described in the background art above, existing hub motor driving systems generally comprise two independent bearing devices, which are used as a motor bearing for bearing a load of a driving motor and a wheel bearing for bearing a load of a wheel, respectively. According to an aspect of the present disclosure, a bearing device of the hub motor driving system disclosed herein is used not only as a wheel bearing but also as a motor bearing, thus reducing the number of bearings, and the axial size of the hub motor driving system can be reduced. In addition, the present disclosure provides for coaxial disposition of the driving motor and the bearing devices, such that a space occupied by a driving device is greatly reduced. The driving device is integrated onto the wheel, which facilitates the layout of the vehicle, and reduces the impact of space interference during bumping and turning. By integrating the motor rotor onto the wheel rim, power can be directly transmitted from the motor rotor to the wheel, such that power transmission efficiency is improved.

According to some embodiments of the present disclosure, the hub motor driving system comprises braking devices, wherein the braking devices and the wheel axle are coaxially disposed. Since the driving motor, bearing devices, and braking devices are all coaxially disposed, space is saved, and the stability of the system is improved. The output flange may be connected to the braking devices on the other axial direction side in an anti-torque manner. According to the present disclosure, the output flange is connected to the wheel rim on the axial direction side in an anti-torque manner and is connected to the braking devices on the other axial direction side in an anti-torque manner, thereby simplifying a drivetrain of the hub motor driving system and improving torque transmission efficiency.

According to some embodiments of the present disclosure, the driving motor is provided with a motor housing and a motor housing cover, and the motor stator of the driving motor is supported by the motor housing cover, wherein the motor housing and the motor housing cover are supported on the output flange. A protective shell for the driving motor is formed by the motor housing and the motor housing cover to prevent external factors from affecting the operation of the motor. The motor housing and the motor housing cover are also supported on the output flange, such that the structure of the system is simplified. A motor vibration bearing may be provided between the output flange and the motor housing cover. Since the hub motor driving system is mounted on the wheel, bumping may occur during actual operation. In order to prevent the performance of the driving motor from being affected, the motor vibration bearing is provided to provide support for the motor stator when vibration occurs, so as to maintain the stability of the motor stator. A first sealing member may be provided between the motor housing and the output flange, and a second sealing member is provided between the motor housing cover and the output flange. The first and second sealing members are used for keeping a motor compartment clean and preventing dust and muddy water from entering the motor compartment.

According to some embodiments of the present disclosure, the bearing devices comprise an outer bearing provided on the axial direction side and an inner bearing provided on the other axial direction side, wherein the outer bearing and the inner bearing are spaced apart from each other in an axial direction. A pair of bearings is used to form a bearing group, and the two bearings cooperate with each other to constitute a more stable supporting structure. In order to simplify the structure, the output flange supports the motor rotor by means of a motor rotor support, wherein the motor rotor support is connected to the output flange and the motor rotor in a radial direction in an anti-torque manner, and the motor rotor transmits torque to the output flange by means of the motor rotor support, thereby shortening the power transmission path, and improving the power transmission efficiency. It may also be considered that a wheel rim positioning member is provided on the output flange, and the output flange is connected to the wheel rim by means of the wheel rim positioning member, such that the output flange and the wheel rim are accurately connected in an extremely convenient manner to transmit the torque to the wheel rim by means of the output flange, thereby reducing component costs, and simplifying the structure.

In addition, a vehicle may be provided with the hub motor driving system according to the description above.

BRIEF DESCRIPTION OF THE DRAWINGS

Preferred embodiments of the present disclosure will be described in detail below with reference to the drawings. Drawings are as follows.

DETAILED DESCRIPTION

Figure 1:
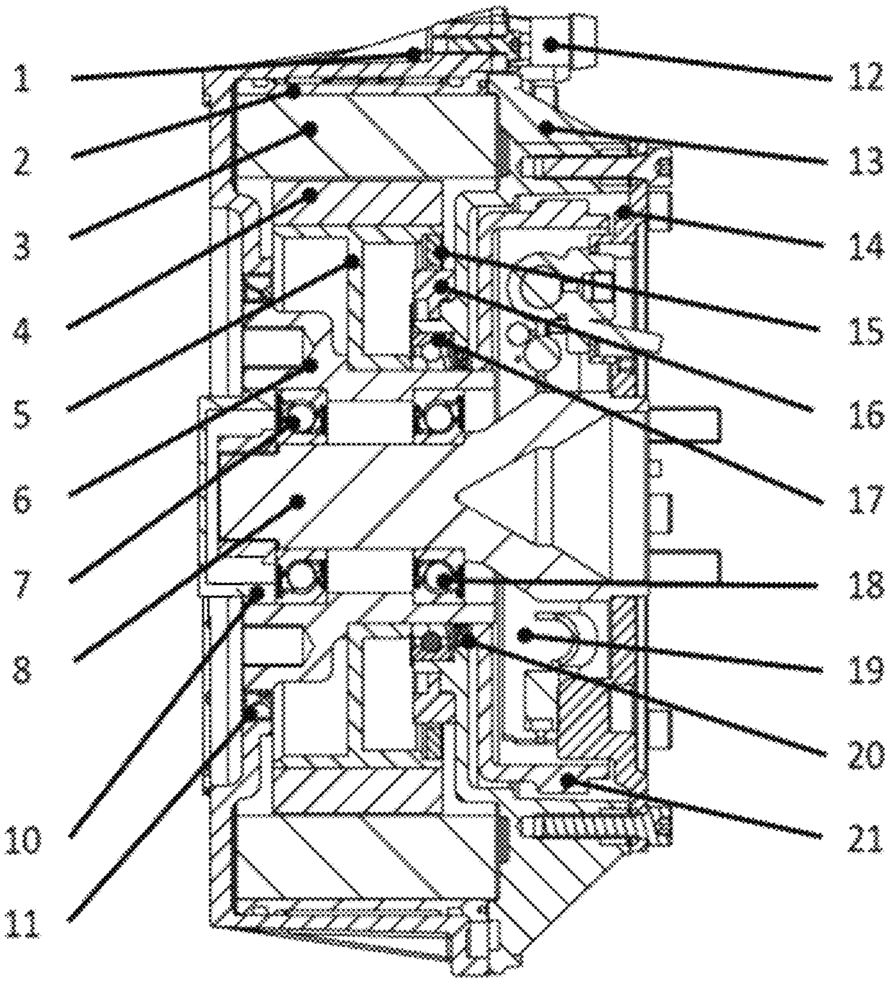
FIG. 1 shows a schematic diagram of a hub driving system according to the present disclosure.

Specific embodiments of the hub driving system according to the present disclosure will be described below with reference to the drawings. The following detailed description and drawings are intended to exemplarily illustrate the principle of the present disclosure. The present disclosure is not limited to the described preferred embodiments, and the scope of protection of the present disclosure is defined by the claims.

In addition, space-related terms (such as "upper", "lower", "left", and "right") are used for describing the relative position relationship of one element to another element as shown in the drawings. Therefore, the space-related terms may be applied to directions that are different from those shown in the drawings when in use. Obviously, although all of the space-related terms refer to the directions shown in the drawings for ease of explanation, a person skilled in the art can understand that directions different from those shown in the drawings may be used. In this specification, the terms "axial (direction)", "radial (direction)", and "circumferential (direction)" refer to the axial direction, radial direction, and circumferential direction of a housing of a hub motor driving system, respectively, the axial direction side refers to the left side in FIG. 1, and the other axial direction side refers to the right side in FIG. 1.

Figure 2:
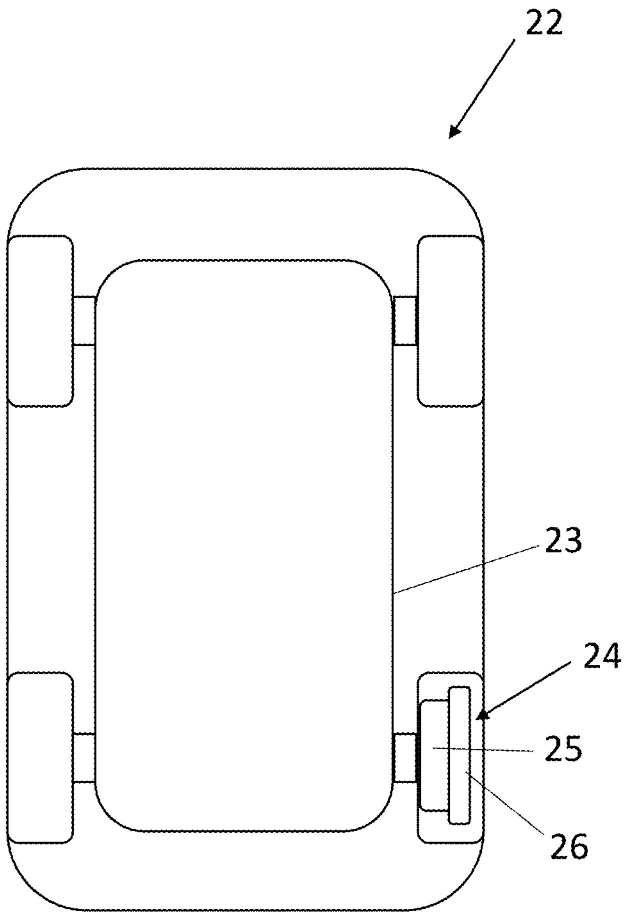
FIG. 2 shows a schematic diagram of a vehicle that includes a frame, a wheel, a wheel rim, and hub motor driving system, according to one embodiment.

FIGS. 1 and 2 each shows a schematic diagram of a hub motor driving system 25 according to the present disclosure. The hub motor driving system 25 according to the present disclosure will be described in detail below with reference to FIGS. 1 and 2.

As shown in FIGS. 1 and 2, the hub motor driving system 25 comprises a driving motor, a cooling device, bearing devices, and braking devices, wherein all these components and a wheel axle 8 are coaxially disposed, and the wheel axle 8 is fixedly connected to a frame 23 of a vehicle 22, for transmitting a load of the entire vehicle 22 to wheels 24.

The driving motor comprises a motor stator 3 and a motor rotor 4, wherein the motor rotor 4 is connected to an output flange 6 in an anti-torque manner by means of a motor rotor support 5. The output flange 6 and the wheel axle 8 are also coaxially disposed. The output flange 6 is fixedly connected to a wheel rim 26 on the axial direction side and is fixedly connected to a brake drum 21 on the other axial direction side. The weight of the driving motor is transmitted to the output flange 6 by means of the rotor support, and the output flange 6 bears a load of the driving motor. A motor housing 1 is provided on an outer side of the driving motor, for protecting and supporting the driving motor, and the motor housing 1 can simultaneously serve as a part of a cooling device 2. The cooling device 2 is assembled on the motor housing 1, and a cooling passage is formed to cool the motor stator 3. The cooling device 2 is further provided with a cooling joint 12 provided on the motor housing 1. The driving motor is closed, on the other axial direction side, by means of a motor housing cover 13. In addition, a stator sensor 16 for monitoring the motor stator 3 is assembled on the motor housing cover 13, and a rotor sensor 15 for monitoring the motor rotor 4 is assembled on the motor rotor support 5. On a side facing the wheel rim 26, a sealing member 11 is provided between the motor housing 1 and the output flange 6, for keeping a motor compartment clean and preventing dust and muddy water from entering the motor compartment. On the other axial direction side, a sealing member 20 is provided between the motor housing cover 13 and the output flange 6, which is also used for keeping the motor compartment clean and preventing dust and muddy water from entering the motor compartment.

The bearing devices comprise an outer bearing 7 located on the axial direction side and an inner bearing 18 located on the other axial direction side, wherein the outer bearing 7 and the inner bearing 18 are placed between the output flange 6 and the wheel axle 8, and are sleeved on the wheel axle 8; therefore, the outer bearing 7 and the inner bearing 18 are used as wheel bearings to support the weight of the vehicle 22, and are also used as motor bearings to bear the load of the driving motor, i.e., serving as both a wheel bearing and a motor bearing at the same time. In this embodiment, only a pair of bearings is provided for supporting the weight of the vehicle 22 and the motor at the same time, such that the number of bearings is saved, space requirements are reduced, in particular, the axial space of the hub motor driving system 25 is reduced, and costs are reduced. In addition, as shown in FIG. 1, a motor vibration bearing 17 is provided between the output flange 6 and the motor housing cover 13, wherein the motor vibration bearing 17 is used for supporting the motor stator 3 only when the system vibrates. In addition, a wheel rim positioning member 10 is provided on the output flange 6 and on the axial direction side of the outer bearing 7, for connection between the output flange 6 and the wheel rim 26 of the wheel 24 of the vehicle 22.

The braking devices comprise a brake pad 19 and the brake drum 21. The brake pad 19 is connected to the motor housing cover 13 by means of an outer cover plate 14, and the brake drum 21 is connected to the output flange 6 in an anti-torque manner.

Driving torque of the hub motor driving system 25 according to the present disclosure is transmitted in the system in a manner that: the motor rotor 4 of the driving motor generates driving torque and transmits the driving torque to the motor rotor support 5; since the motor rotor support 5 is connected to the output flange 6 in an anti-torque manner, the driving torque is further transmitted to the output flange 6; and the output flange 6 is connected to the wheel rim 26 in an anti-torque manner, thereby transmitting the driving torque to the wheel 24 by means of the wheel rim 26 to drive the wheel 24 to rotate.

The braking devices of the hub motor driving system 25 according to the present disclosure work in a manner that: when braking is required, the system controls the brake pad 19 to transmit braking torque to the brake drum 21; and since the brake drum 21 is fixedly connected to the output flange 6, the brake drum 21 transmits the braking torque to the wheel rim 26 by means of the output flange 6, thereby causing the wheel 24 to be braked.

Although possible embodiments have been described illustratively in the above description, it should be understood that there are still a large number of embodiment variations through combinations of all known technical features and embodiments as well as those that are readily apparent to those skilled in the art. In addition, it should be further understood that the exemplary embodiments are just examples and shall not in any way limit the scope of protection, application and construction of the present disclosure. The foregoing description is more intended to provide a person skilled in the art with a technical guide for converting at least one exemplary embodiment, in which various changes can be made as long as they do not depart from the scope of protection of the claims.

LIST OF REFERENCE NUMERALS

1 Motor housing
2 Cooling device
3 Motor stator
4 Motor rotor
5 Motor rotor support
6 Output flange
7 Outer bearing
8 Wheel axle
10 Wheel rim positioning member
11 Sealing member
12 Cooling joint
13 Motor housing cover
14 Outer cover plate
15 Rotor sensor
16 Stator sensor
17 Motor vibration bearing
18 Inner bearing
19 Brake pad
20 Sealing member
21 Brake drum
22 Vehicle
23 Frame
24 Wheel
25 Hub motor driving system
26 Wheel rim

The invention claimed is:

1. A hub motor driving system for a vehicle, comprising:
a wheel axle, wherein the wheel axle is fixedly connected to a frame of the vehicle;
a driving motor, wherein the driving motor is provided with a motor stator and a motor rotor which is located on a radial inner side of the motor stator and can rotate relative to the motor stator, and the driving motor and the wheel axle are coaxially disposed;
a motor housing and a motor housing cover supporting the motor stator;
an output flange extending between an axial direction side and an opposing axial direction side, wherein the output flange radially supports the motor rotor and rotates along with the motor rotor, and wherein the output flange is connected to a wheel rim of a wheel on the axial direction side of the output flange;
braking components coupled to the output flange proximate the opposing axial direction side, wherein the motor housing cover is disposed between the motor rotor and the braking components; and
bearing components, wherein the bearing components are radially supported between the output flange and the wheel axle, and wherein the bearing components bear both a load of the driving motor and a load of the frame.

2. The hub motor driving system of claim 1, wherein the braking components and the wheel axle are coaxially disposed.

3. The hub motor driving system of claim 2, wherein the output flange is connected to at least one of the braking components on the opposing axial direction side of the output flange, such that the at least one of the braking components is configured to rotate with the output flange.

4. The hub motor driving system of claim 1, wherein a motor vibration bearing is provided between the output flange and the motor housing cover, and wherein the motor vibration bearing surrounds one of the bearing components proximate the opposing axial direction side of the output flange.

5. The hub motor driving system of claim 4, wherein the output flange supports the motor rotor via a motor rotor support extending radially from the output flange to the motor rotor, and wherein the motor vibration bearing surrounds the output flange between the motor rotor support and the motor housing cover.

6. The hub motor driving system of claim 1, wherein a first sealing member is provided between the motor housing and the output flange, and a second sealing member is provided between the motor housing cover and the output flange.

7. The hub motor driving system of claim 1, wherein the bearing components comprise an outer bearing provided on the axial direction side and an inner bearing provided on the opposing axial direction side, and wherein the outer bearing and the inner bearing are spaced apart from each other in an axial direction.

8. The hub motor driving system of claim 1, wherein the output flange supports the motor rotor by means of a motor rotor support, and wherein the motor rotor support is connected to the output flange and the motor rotor in a radial direction.

9. The hub motor driving system of claim 1, wherein a wheel rim positioning member is provided on the output flange and is coaxial with the wheel axle.

10. A vehicle, comprising:
a frame;
a wheel having a wheel rim; and
a hub motor driving system that operably couples the wheel and the frame, comprising:

a wheel axle fixedly connected to the frame;

a driving motor that includes a motor stator and a motor rotor located on a radial inner side of the motor stator and operable to rotate relative to the motor stator, wherein the driving motor and the wheel axle are coaxially disposed;

an output flange that radially supports and rotates with the motor rotor, wherein the output flange is connected to the wheel rim of the wheel on the axial direction side of the output flange;

at least one bearing component disposed radially between the output flange and the wheel axle and configured to bear both a load of the frame via the wheel axle and a load of the driving motor;

a motor housing and a motor housing cover, wherein the motor stator is supported by the motor housing cover, and wherein the motor housing and the motor housing cover are supported on the output flange; and a motor vibration bearing disposed between the output flange and the motor housing cover, wherein a bearing component of the at least one bearing component is axially aligned with the motor vibration bearing.

11. The vehicle of claim 10, wherein the at least one bearing component comprises a plurality of bearing components.

12. The vehicle of claim 11, wherein the plurality of bearing components includes an outer bearing and an inner bearing that are in an axially-spaced relationship.

13. The vehicle of claim 10, wherein the hub motor driving system further comprises:

braking components that are coaxially disposed with the wheel axle.

14. The vehicle of claim 13, wherein the braking components include a brake drum, and wherein the output flange is connected to the brake drum on the other axial direction side of the output flange, such that the brake drum is configured to rotate with the output flange.

15. The vehicle of claim 10, wherein the hub motor driving system further comprises:

a first sealing member disposed between the motor housing and the output flange; and a second sealing member disposed between the motor housing cover and the output flange.

16. The vehicle of claim 10, wherein the output flange supports the motor rotor via a motor rotor support, and wherein the motor rotor support is connected to the output flange and the motor rotor in a radial direction.

17. The vehicle of claim 10, wherein the hub motor driving system further comprises:

a wheel rim positioning member disposed on the output flange to be coaxial with the wheel axle, wherein the wheel rim positioning member at least partially receives the wheel axle.

18. The vehicle of claim 17, wherein the wheel rim positioning member is at least partially received by the output flange.

19. The vehicle of claim 10, wherein the motor housing and the motor housing cover together encapsulate the driving motor, and wherein the motor housing cover defines a recess containing a brake drum connected to the output flange such that the motor housing cover is disposed between the driving motor and the brake drum.

20. The vehicle of claim 10, wherein the hub motor driving system includes a motor sensor disposed between the motor rotor and the output flange, and wherein the motor sensor is axially aligned with the motor vibration bearing.

* * * * *